US009169736B2

(12) United States Patent
Hayford et al.

(10) Patent No.: US 9,169,736 B2
(45) Date of Patent: Oct. 27, 2015

(54) JOINT BETWEEN AIRFOIL AND SHROUD

(75) Inventors: Richard K. Hayford, Cape Neddick, ME (US); Glen E. Potter, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 631 days.

(21) Appl. No.: 13/549,768

(22) Filed: Jul. 16, 2012

(65) Prior Publication Data

US 2014/0013772 A1   Jan. 16, 2014

(51) Int. Cl.
*F01D 9/04* (2006.01)
*F01D 9/02* (2006.01)
*F01D 25/24* (2006.01)

(52) U.S. Cl.
CPC *F01D 9/044* (2013.01); *F01D 9/04* (2013.01); *F01D 9/042* (2013.01); *F01D 25/246* (2013.01)

(58) Field of Classification Search
CPC ............. F01D 9/02; F01D 9/04; F01D 9/042; F01D 9/044; F01D 25/246
See application file for complete search history.

(56) References Cited

U.S. PATENT DOCUMENTS

| | | | |
|---|---|---|---|
| 5,332,360 A | 7/1994 | Correia et al. | |
| 5,411,368 A | 5/1995 | Chase et al. | |
| 5,474,419 A * | 12/1995 | Reluzco et al. | 415/209.4 |
| 5,797,725 A * | 8/1998 | Rhodes | 415/209.2 |
| 6,409,473 B1 * | 6/2002 | Chen et al. | 415/191 |
| 7,329,087 B2 * | 2/2008 | Cairo et al. | 415/135 |
| 7,914,255 B2 * | 3/2011 | Workman et al. | 415/190 |
| 2005/0100442 A1 | 5/2005 | Clement | |
| 2010/0129210 A1 | 5/2010 | Headley et al. | |
| 2011/0081239 A1 | 4/2011 | Durocher | |
| 2011/0243724 A1 * | 10/2011 | Campbell et al. | 415/208.2 |

FOREIGN PATENT DOCUMENTS

JP        2004304930 A        10/2004

OTHER PUBLICATIONS

International Search Report and Written Opinion for International Application No. PCT/US2013/050204 completed on Sep. 13, 2013.
International Preliminary Report on Patentability for International Application No. PCT/US2013/050204 mailed Jan. 29, 2015.

* cited by examiner

*Primary Examiner* — Igor Kershteyn
(74) *Attorney, Agent, or Firm* — Carlson, Gaskey & Olds, PC

(57) ABSTRACT

A stator joint for a gas turbine engine has a center axis, and a shroud having a radial wall facing substantially radially with respect to the center axis. A slot wall defines in-part a slot in the shroud. A relief wall defines a relief area of the slot. The relief wall extends between the radial wall and the slot wall. A vane has an airfoil and a lug extending into the slot. A flowable attachment material is disposed in the relief area for engagement of the vane to the shroud. A vane assembly and a gas turbine engine are also disclosed.

21 Claims, 3 Drawing Sheets

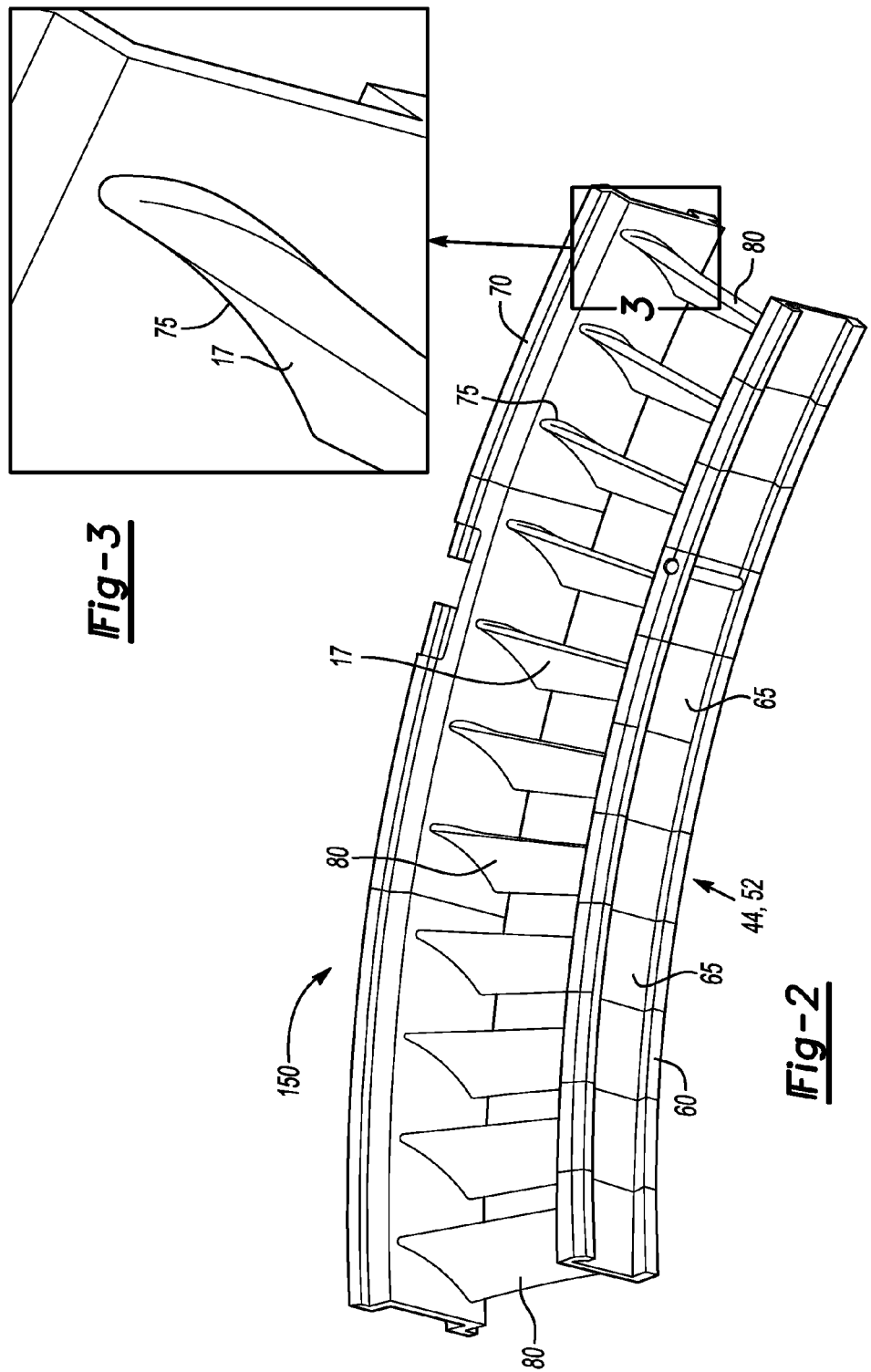

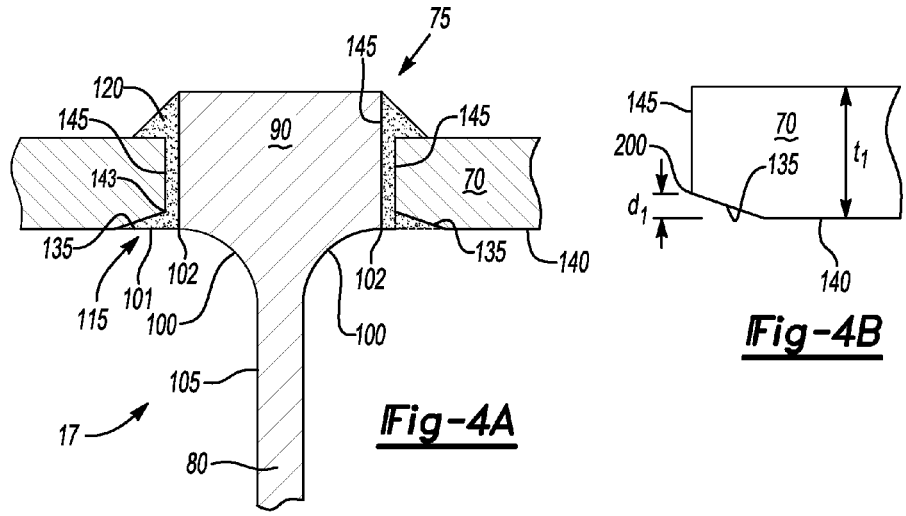
Fig-4A
Fig-4B
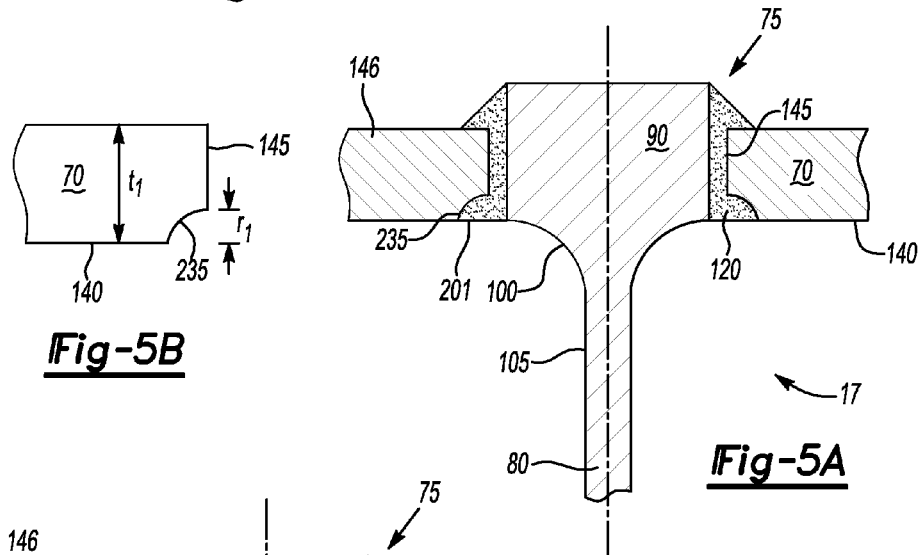
Fig-5B
Fig-5A
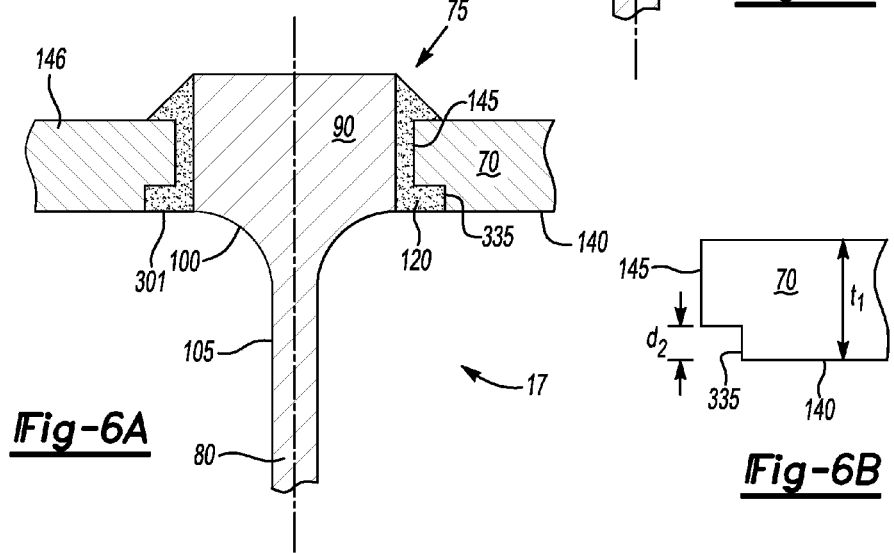
Fig-6A
Fig-6B

JOINT BETWEEN AIRFOIL AND SHROUD

BACKGROUND

This disclosure relates to a joint between a vane and shroud, for use in a gas turbine engine.

Gas turbine engine vane assemblies typically include vanes having airfoils mounted between two rings or partial rings (shrouds) that form a flowpath for the gas turbine engine. The vanes are typically brazed to the shrouds, and may have lugs at radial ends received in slots in the shrouds.

One application for such an assembly is in a compressor. Generally, there are vane assemblies intermediate rotor stages in the compressor.

In the prior art, the lugs are inserted into slots in radially inner and outer shrouds. Some flowable attachment material, such as a brazing material, has typically been deposited between the lugs and the slots. There have been two basic types of this structure used. In a first type, the lugs extend radially inward of the outer shroud and radially outwardly of the inner shroud. These enlarged lugs provide a dam preventing the flowable attachment material from extending to locations on the airfoil. However, these enlarged lugs also present an obstruction to a desired air flow cross-sectional area between the airfoils.

It is also known to have the lugs not extend radially beyond the shroud walls. With this structure, the flowable attachment material could move beyond the lug and toward surfaces of the airfoil which can cause damage to the vanes.

These and other features of this application will be best understood from the following specification and drawings, the following of which is a brief description.

SUMMARY

In a featured embodiment, a vane and shroud for a gas turbine engine include a center axis with a shroud having a radial wall facing substantially radially with respect to the center axis. A slot wall defines a slot in the shroud. A relief wall defines a relief area of the slot and extends between the radial wall and the slot wall. A vane has an airfoil and a lug extending into the slot. A flowable attachment material is disposed in the relief area for engagement of the vane to the shroud.

In another embodiment according to the previous embodiment, the slot is larger than the lug, such that said flowable attachment material is also disposed between the lug and the slot wall.

In another embodiment according to any of the previous embodiments, the relief area has a triangular cross-section.

In another embodiment according to any of the previous embodiments, the relief area has a curved cross-section.

In another embodiment according to any of the previous embodiments, the relief area has a rectangular cross-section.

In another embodiment according to any of the previous embodiments, the lug merges into a transition section which curves circumferentially inwardly from the lug to the airfoil.

In another embodiment according to any of the previous embodiments, the radial wall is generally radially aligned with a radial extent of the transition section which is most adjacent to the radial wall.

In another embodiment according to any of the previous embodiments, a depth of the relief wall is defined to a point most radially distant from a surface of the radial wall facing the center axis. A radial wall thickness is defined for the shroud adjacent to the relief area, and a ratio of the depth to the radial wall thickness is between about 0.2 and 0.6.

In another featured embodiment, a vane assembly includes a circumferentially extending outer shroud and a circumferentially extending inner shroud centered on a center axis. A plurality of vanes is positioned radially between the inner and outer shrouds. A joint is between the vanes and at least one of the inner and outer shrouds. The at least one shroud has a radial wall facing substantially radially with respect to the center axis. A plurality of slots is in the at least one shroud. Slot walls define the slots in the at least one shroud. A relief wall defines a relief area of the slots and extends between the radial wall and the slot wall. The vanes have an airfoil and a lug extending into one of the slots. A flowable attachment material is disposed in the relief area for engagement of the vane to at least one of the inner and outer shrouds.

In another embodiment according to the previous embodiment, the slot is larger than the lug, such that said flowable attachment material is also disposed between the lug and the wall.

In another embodiment according to any of the previous embodiments, the relief area has a triangular cross-section.

In another embodiment according to any of the previous embodiments, the relief area has a curved cross-section.

In another embodiment according to any of the previous embodiments, the relief area has a rectangular cross-section.

In another embodiment according to any of the previous embodiments, the lug merges into a transition section which curves circumferentially from the lug to the airfoil.

In another embodiment according to any of the previous embodiments, the radial wall is generally radially aligned with a radial extent of the transition section which is most adjacent to the radial wall.

In another embodiment according to any of the previous embodiments, the at least one shroud is the outer shroud.

In another embodiment according to any of the previous embodiments, a depth of the relief area is defined to a point most radially distant from a surface of the radial wall facing the center axis. A radial wall thickness is defined for the shroud adjacent to the relief area, and a ratio of the depth to the radial wall thickness is between about 0.2 and 0.6.

In another featured embodiment, a gas turbine engine has a compressor section, a combustor section and a turbine section. The compressor section and the turbine section are defined by a plurality of rotor stages and a plurality of vane assemblies positioned between adjacent ones of the rotor stages. At least one of the vane assemblies has a circumferentially extending outer shroud and a circumferentially extending inner shroud centered on a center axis. A plurality of vanes is positioned radially between the inner and outer shrouds. A joint is between the vanes and at least one of the inner and outer shrouds such that the at least one shroud has a radial wall facing substantially radially with respect to the center axis. A plurality of slots is in the at least one shroud. Slot walls define the slots in the at least one shroud. A relief wall defines a relief area of the slots and extends between the radial wall and the slot wall. The vanes have an airfoil and a lug extending into one of the slots. A flowable attachment material is disposed in the relief area for engagement of the vane to at least one of the inner and outer shrouds In another embodiment according to the previous embodiment, the at least one of vane assemblies is in the compressor section.

In another embodiment according to any of the previous embodiments, the at least one shroud is the radially outer shroud.

BRIEF DESCRIPTION OF THE DRAWINGS

FIG. 2 shows a vane assembly for use in FIG. 1.

FIG. 3 is an enlarged view of the area inside the box 3 of FIG. 2.

FIG. 4A illustrates a first embodiment of a vane and shroud.

FIG. 4B shows a detail of FIG. 4A.

FIG. 5A is a view of a second embodiment vane and shroud.

FIG. 5B shows a detail of FIG. 5A.

FIG. 6A is a view of a third embodiment vane and shroud.

FIG. 6B is a detail of FIG. 6A.

DETAILED DESCRIPTION

Figure 1:
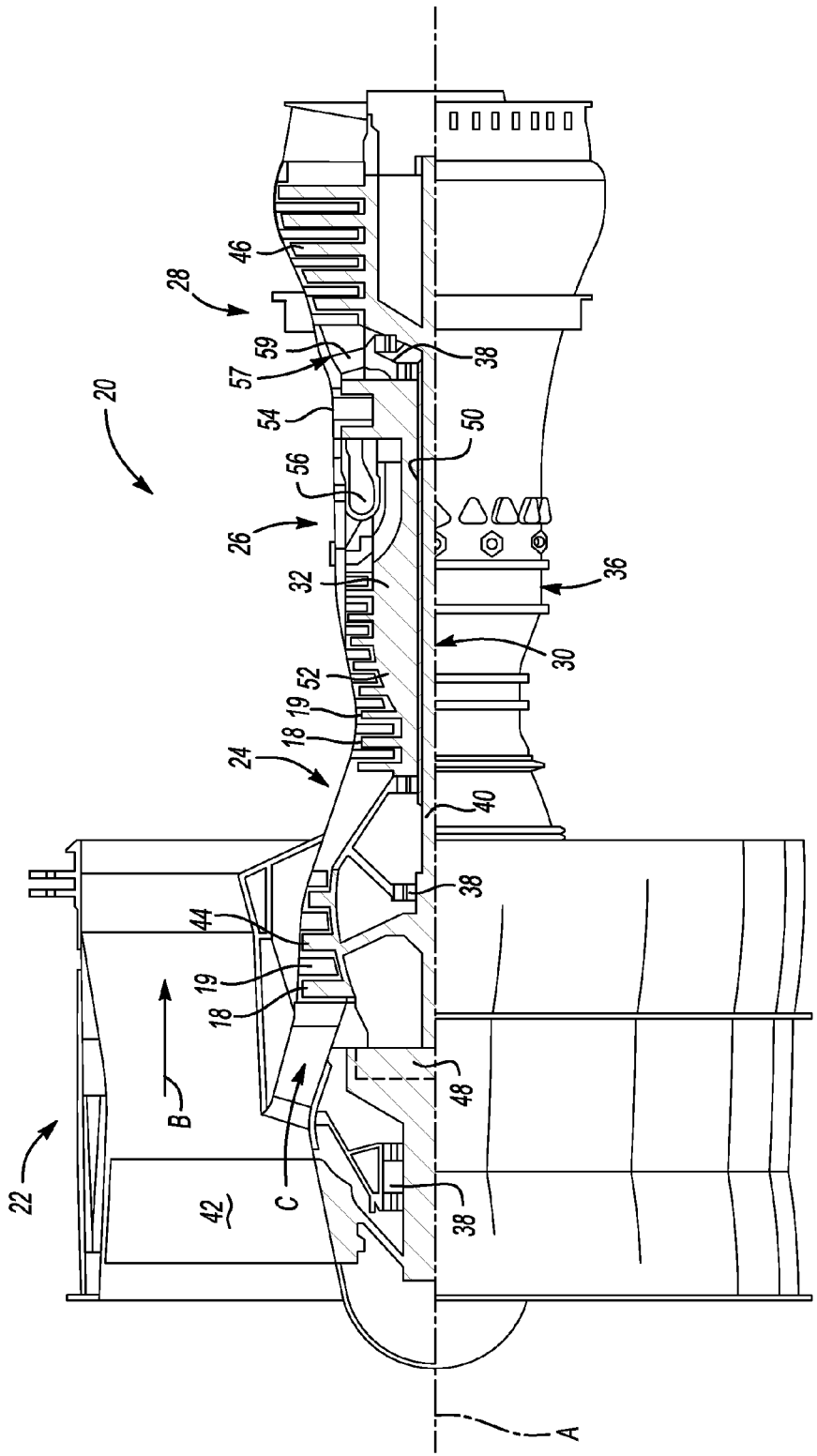
FIG. 1 is a schematic, cross-sectional side view of an embodiment of a gas turbine engine.

FIG. 1 schematically illustrates a gas turbine engine 20. The gas turbine engine 20 is shown herein is a two-spool turbofan that generally incorporates a fan section 22, a compressor section 24, a combustor section 26 and a turbine section 28. Alternative engines might include an augmentor section (not shown) among other systems or features. The fan section 22 drives air in a bypass flowpath B and also drives air along a core flowpath C for compression and communication into the compressor section 24, and combustor section 26, then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures, and ground-based power generating engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

As known, the compressor sections 44 and 52 include rotating blade stages 18 and intermediate vane assemblies 19. Both of these structures are shown schematically. It is known that the blades 18 typically rotate with a rotor. The vanes 19 typically are provided in the form of a ring, with vanes extending radially between an inner shroud and an outer shroud. The turbine sections 44 and 46 also have blades 18 and vane assemblies 19.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. In addition, gas turbine engines for other applications such as land-based power generation turbines may also benefit from the teachings of this application.

A vane assembly 150 for use in a compressor section of a gas turbine engine is illustrated in FIG. 2. As seen in FIG. 2, inner shroud 60 and outer shroud 70 may be segmented for easier installation within the engine 20. Only a circumferential portion of the vane assembly 150 is shown. As known, a plurality of segments 65 are connected together, and typically form a full ring. Inner shroud 60 has a plurality of slots, and an outer shroud 70 has a plurality of slots 75. A plurality of vanes 17 are disposed in the slots in the inner shroud 60 and the outer shroud 70.

Referring to FIG. 3, an outer portion of the vane 17 is disposed in a slot 75 in outer shroud 70. Typically, lugs 90 (e.g., see lug 90 in FIG. 4A) are used to attach the vanes 17 to the outer shroud 70. Some flowable attachment material, which is appropriate for securing the respective metals of the vane 17 and the shrouds 60 and 70 may be utilized. Various brazing materials are known, and would be appropriate for the teachings of this application.

Referring to FIG. 4A, lugs 90 are shaped to generally fit into respective slots 75. Vane 17 has a curved transition section 100 formed to merge an airfoil 80 into lug 90 by curving circumferentially inwardly. A maximum stress area 105 exists where the transition section 100 blends in the airfoil 80.

As is clear, the slot 75 is larger than lug 90, so there is clearance. A brazing material 120 is disposed in the clearance, and used to secure the lugs 90 to the shroud 70. Material 120 does not substantially contact area 105 during the brazing because of chamfers or relief areas 101 formed by a relief wall 135 formed in radially inner wall 140. This will be explained below. This lack of contact prevents fatigue at area 105 and thereby extends the life of the vane assembly 150. At the same time, the lightweight and aerodynamic configuration does not cause flow obstruction that could otherwise reduce engine efficiency.

In this embodiment, an outer extent 102 of the transition section 100 may be in register (i.e., aligned) with inner wall 140 of the outer shroud 70 to not obstruct air flow. Alternatively, the outer extent 102 of the transition section 100 may be radially outwardly of the inner wall 140, as this would also eliminate obstruction to air flow. The slot 75 is generally defined by the slot walls 145. As can be seen, the relief walls 135 are formed as chamfers. The relief wall 135 extends in a direction with a radially outer component, and a component in a circumferential direction, such that the resulting shape is triangular, or a chamfer. The relief area 101 provides an area for the brazing material 120 to flow when it is heated, thereby minimizing a possibility that the brazing material 120 might reach the transition section 100 or the maximum stress area 105.

FIG. 4B shows shroud 70 has a wall thickness $t_1$. A radially outermost point 200 of the relief wall 135 extends to a distance $d_1$ away from the inner wall 140. In embodiments, $t_1$ may be between 0.08-0.1" (0.20-0.25 cm). Notably, $t_1$ may be the same across the embodiments of FIGS. 4B and 5B. In such embodiments, $d_1$ may be between 0.02-0.05" (0.05-1.3 cm). A ratio of $d_1$ to $t_1$, or a ratio of the deepest portion of the relief area to the wall thickness of the shroud may be between about 0.2 and 0.6.

FIG. 5A shows another embodiment wherein the relief area 201 is formed by a curved relief wall 235, which in this embodiment may be a circular section. The relief area 201 will function much like the relief area in the FIG. 4A embodiment to provide a space for the flowable material to move, such that it does not move onto the transition section 100.

FIG. 5B shows the wall thickness $t_1$ of the shroud 70, and that the depth of the relief area 235 is formed at a radius $r_1$. In embodiments, $r_1$ may be between 0.02-0.05" (0.05-1.3 cm). Thus, a ratio of $r_1$ to $t_1$ may be between about 0.2 and 0.6.

FIG. 6A shows another relief area embodiment 301 wherein the shape of the relief wall 335 is generally rectangular. Again, this shape will provide space to receive the flowable attachment material.

FIG. 6B shows a detail of the relief wall 335. The distance $d_2$ to the deepest portion of the relief wall, measured away from the wall 140, was between 0.02-0.05" (0.05-1.3 cm). Again, a ratio of $d_2$ to $t_1$ may be between about 0.2 and 0.6.

The distance $t_1$ could be defined as the radial wall thickness of the shroud measured adjacent to the relief area. The dimensions $d_1$, $d_2$, and $r_1$ could all be defined as a depth of the relief area measured to a point most radially distant from an inner surface of the wall 140.

The relief areas work generically to limit flowable attachment material from flowing into the transition section 100 since the flowable attachment material maintains a relatively high viscosity, even when fluent. The material will tend to move into an area of lesser resistance created by the relief areas, rather than turning the corner, such as at outer extent 102, and moving onto the transition section 100.

In accordance with the methods of this application, the outer lug 90 is inserted into the outer slot, and an inner lug is inserted into an inner slot. The vane may be tack welded to the shrouds. The flowable attachment material is then deposited between the slots and the lugs, and the assembly is heated to allow the flowable attachment material to move to a final position at which it hardens, and to create the vane assembly 150.

While the disclosure of this application has been directed to the outer shroud, a worker of ordinary skill in the art would recognize that all of these teachings would apply equally to an inner shroud, and may be utilized at both the inner and outer shrouds.

Although an example embodiment has been disclosed, a person of ordinary skill in this art would recognize that certain modifications would come within the scope of the claims. For instance, a relief area may be created within the transition section. For this reason, the following claims should be studied to determine their true scope and content.

What is claimed is:

1. A vane and shroud for a gas turbine engine having a center axis, comprising:
    a shroud having a radial wall facing substantially radially with respect to the center axis, a slot wall defining a slot in the shroud, a relief wall defining a relief area of the slot and wherein the relief wall extends between the radial wall and the slot wall;
    a vane having an airfoil and a lug extending into the slot;
    a flowable attachment material disposed in the relief area for engagement of the vane to the shroud;
    said lug merges into a transition section which curves circumferentially inwardly from said lug to said airfoil; and
    said radial wall is generally radially aligned with a radial extent of said transition section which is most adjacent to said radial wall.

2. The vane and shroud according to claim 1, wherein said slot is larger than said lug, such that said flowable attachment material is also disposed between said lug and said slot wall.

3. The vane and shroud according to claim 1, wherein said relief area has a triangular cross-section.

4. The vane and shroud according to claim 1, wherein said relief area has a curved cross-section.

5. The vane and shroud according to claim 1, wherein said relief area has a rectangular cross-section.

6. A vane and shroud for a gas turbine engine having a center axis, comprising:
    a shroud having a radial wall facing substantially radially with respect to the center axis, a slot wall defining a slot in the shroud, a relief wall defining a relief area of the slot and wherein the relief wall extends between the radial wall and the slot wall;
    a vane having an airfoil and a lug extending into the slot;
    a flowable attachment material disposed in the relief area for engagement of the vane to the shroud; and
    a depth of the relief wall is defined to a point most radially distant from a surface of said radial wall facing said center axis, and a radial wall thickness is defined for said shroud adjacent to said relief area, and a ratio of said depth to said radial wall thickness being between about 0.2 and 0.6.

7. The vane and shroud according to claim 6, wherein said lug merges into a transition section which curves circumferentially inwardly from said lug to said airfoil.

8. The vane and shroud according to claim 7, wherein said radial wall is generally radially aligned with a radial extent of said transition section which is most adjacent to said radial wall.

9. A vane assembly for use in a gas turbine engine comprising:
    a circumferentially extending outer shroud and a circumferentially extending inner shroud centered on a center axis, and a plurality of vanes positioned radially between said inner and outer shrouds, a joint between said vanes and at least one of said inner and outer shrouds, said at least one said shroud having a radial wall facing substantially radially with respect to the center axis, a plurality of slots in said at least one said shroud, slot walls defining said slots in said at least one said shroud, a relief wall defining a relief area of said slots and wherein the relief wall extends between the radial wall and the slot wall;

said vanes having an airfoil and a lug extending into one of the slots;

a flowable attachment material disposed in the relief area for engagement of the vane to at least one of the inner and outer shrouds;

said jug merging into a transition section which curves circumferentially from said lug to said airfoil; and said radial wall being generally radially aligned with a radial extent of said transition section which is most adjacent to said radial wall.

10. The vane assembly according to claim 9, wherein said slot is larger than said lug, such that said flowable attachment material is also disposed between said lug and said wall.

11. The vane assembly according to claim 9, wherein said relief area has a triangular cross-section.

12. The vane assembly according to claim 9, wherein said relief area has a curved cross-section.

13. The vane assembly according to claim 9, wherein said relief area has a rectangular cross-section.

14. The vane assembly according to claim 9, wherein said at least one said shroud is said outer shroud.

15. A vane assembly for sue in a gas turbine engine comprising:

a circumferentially extending outer shroud and a circumferentially extending inner shroud centered on a center axis, and a plurality of vanes positioned radially between said inner and outer shrouds, a joint between said vanes and at least one of said inner and outer shrouds, said at least one said shroud having a radial wall facing substantially radially with respect to the center axis, a plurality of slots in said at least one said shroud, slot walls defining said slots in said at least one said shroud, a relief wall defining a relief area of said slots and wherein the relief wall extends between the radial wall and the slow wall;

said vanes having an airfoil and a lug extending into one of the slots;

a flowable attachment material disposed in the relief area for engagement of the vane to at least one of the inner and outer shrouds; and a depth of the relief area is defined to a point most radially distant from a surface of said radial wall facing said center axis, and a radial wall thickness is defined for said shroud adjacent to said relief area, and a ratio of said depth to said radial wall thickness being between about 0.2 and 0.6.

16. The vane assembly according to claim 15, wherein said lug merges into a transition section which curves circumferentially from said lug to said airfoil.

17. The vane assembly according to claim 15, wherein said radial wall is generally radially aligned with a radial extent of said transition section which is most adjacent to said radial wall.

18. A gas turbine engine comprising:

a compressor section, a combustor section and a turbine section, with said compressor section and said turbine section being defined by a plurality of rotor stages and a plurality of vane assemblies positioned between adjacent ones of said rotor stages;

at least one of said vane assemblies having a circumferentially extending outer shroud and a circumferentially extending inner shroud centered on a center axis, and a plurality of vanes positioned radially between said inner and outer shrouds, a joint between said vanes and at least one of said inner and outer shrouds such that said at least one said shroud having a radial wall facing substantially radially with respect to the center axis, a plurality of slots in said at least one said shroud, slot walls defining said slots in said at least one said shroud, a relief wall defining a relief area of said slots and wherein the relief wall extends between the radial wall and the slot wall;

said vanes having an airfoil and a lug extending into one of the slots;

a flowable attachment material disposed in the relief area for engagement of the vane to at least one of the inner and outer shrouds; and a depth of the relief area is defined to a point most radially distant from a surface of said radial wall facing said center axis, and a radial wall thickness is defined for said shroud adjacent to said relief area, and a ratio of said depth to said radial wall thickness being between about 0.2 and 0.6.

19. The gas turbine engine according to claim 18, wherein said at least one of said vane assemblies is in said compressor section.

20. The gas turbine engine according to claim 19, wherein said at least one shroud is said radially outer shroud.

21. The vane and shroud according to claim 18, wherein said lug merges into a transition section which curves circumferentially inwardly from said lug to said airfoil, and said radial wall is generally radially aligned with a radial extent of said transition section which is most adjacent to said radial wall.

* * * * *

UNITED STATES PATENT AND TRADEMARK OFFICE
CERTIFICATE OF CORRECTION

| | | |
|---|---|---|
| PATENT NO. | : 9,169,736 B2 | Page 1 of 1 |
| APPLICATION NO. | : 13/549768 | |
| DATED | : October 27, 2015 | |
| INVENTOR(S) | : Richard K. Hayford et al. | |

It is certified that error appears in the above-identified patent and that said Letters Patent is hereby corrected as shown below:

IN THE CLAIMS:

In claim 9, column 7, line 11; delete "jug" and replace with --lug--

In claim 15, column 7, line 27; delete "sue" and replace with --use--

In claim 15, column 7, line 39; delete "slow" and replace with --slot--

In claim 21, column 8, line 44; delete "vane and shroud" and replace with --gas turbine engine--

Signed and Sealed this
Fifteenth Day of March, 2016

Michelle K. Lee
*Director of the United States Patent and Trademark Office*